(12) United States Patent
Roth

(10) Patent No.: US 9,152,982 B2
(45) Date of Patent: Oct. 6, 2015

(54) METHOD OF COMPENSATING A PROVIDER FOR ADVERTISEMENTS DISPLAYED ON A MOBILE PHONE

(75) Inventor: Daniel Lawrence Roth, Boston, MA (US)

(73) Assignee: Nuance Communications, Inc., Burlington, MA (US)

( * ) Notice: Subject to any disclaimer, the term of this patent is extended or adjusted under 35 U.S.C. 154(b) by 1182 days.

(21) Appl. No.: 11/207,594

(22) Filed: Aug. 19, 2005

(65) Prior Publication Data

US 2007/0042760 A1 Feb. 22, 2007

(51) Int. Cl.
*H04L 29/06* (2006.01)
*G06Q 30/02* (2012.01)
*H04L 12/14* (2006.01)
*H04L 29/08* (2006.01)

(52) U.S. Cl.
CPC ............ *G06Q 30/0267* (2013.01); *G06Q 30/02* (2013.01); *G06Q 30/0273* (2013.01); *H04L 12/14* (2013.01); *H04L 67/04* (2013.01); *H04L 67/20* (2013.01)

(58) Field of Classification Search
USPC ............. 455/412.1, 412.2, 413, 414.1, 414.2, 455/414.3, 414.4, 456.1, 456.3, 456.6, 455/550.1, 556.2, 566; 715/854, 201, 205, 715/206, 839; 705/14.68, 14.57, 14.58, 705/14.64; 709/201, 217, 202, 203, 218, 709/219
See application file for complete search history.

(56) References Cited

U.S. PATENT DOCUMENTS

| 5,933,811 | A | 8/1999 | Angles et al. |
| 6,031,467 | A | 2/2000 | Hymel et al. |
| 6,084,583 | A | 7/2000 | Gerszberg et al. |
| 6,128,651 | A | 10/2000 | Cezar |

(Continued)

FOREIGN PATENT DOCUMENTS

| EP | 0 854 417 A2 | 7/1998 | ............... G06F 3/16 |
| EP | 1 073 292 A2 | 1/2001 | |

(Continued)

OTHER PUBLICATIONS

Dalianis et al., "SiteSeeker Voice—A speech controlled search engine," Feb. 25, 2003), http://www.nada.kth.se/hercules/wapalizer/SiteSeekerVoice.html> retrieved on Oct. 30, 2006.

(Continued)

*Primary Examiner* — Khai M Nguyen
(74) *Attorney, Agent, or Firm* — Wolf, Greenfield & Sacks, P.C.

(57) ABSTRACT

A method and apparatus for advertising on a mobile phone. In one embodiment the method includes the steps of downloading an advertisement to the mobile phone using an advertisement server; selecting the downloaded advertisement on the mobile phone by a user of the mobile phone; providing by a server additional information in response to the user selection; and tracking the selection and additional information by the server. In another embodiment the compensation provided is in response to the display screen of said advertisement. In another embodiment the step of providing additional information includes the step of using space reserved, in the user interface of the mobile phone, for advertisements. Another aspect the invention relates to a system for displaying advertisements on a mobile phone. In one embodiment the system includes a server; and a mobile phone in communication with said server.

22 Claims, 3 Drawing Sheets

(56) References Cited

U.S. PATENT DOCUMENTS

| | | | |
|---|---|---|---|
| 6,141,010 A | 10/2000 | Hoyle | |
| 6,157,841 A | 12/2000 | Bolduc et al. | |
| 6,285,364 B1* | 9/2001 | Giordano et al. | 715/804 |
| 6,298,218 B1 | 10/2001 | Lowe et al. | |
| 6,332,127 B1 | 12/2001 | Bandera et al. | |
| 6,381,465 B1 | 4/2002 | Chern et al. | |
| 6,397,057 B1 | 5/2002 | Malackowski et al. | |
| 6,401,085 B1 | 6/2002 | Gershman et al. | |
| 6,452,498 B2 | 9/2002 | Stewart | |
| 6,484,148 B1 | 11/2002 | Boyd | |
| 6,560,456 B1 | 5/2003 | Lohtia et al. | |
| 6,608,556 B2 | 8/2003 | De Moerloose et al. | |
| 6,647,269 B2 | 11/2003 | Hendrey et al. | |
| 6,727,930 B2* | 4/2004 | Currans et al. | 715/864 |
| 6,753,884 B1 | 6/2004 | Finch, II et al. | |
| 6,769,010 B1 | 7/2004 | Knapp et al. | |
| 6,826,614 B1 | 11/2004 | Hanmann et al. | |
| 6,842,767 B1 | 1/2005 | Partovi et al. | |
| 6,862,445 B1 | 3/2005 | Cohen | |
| 6,885,736 B2 | 4/2005 | Uppaluru | |
| 7,058,593 B1* | 6/2006 | Merritt | 705/14.14 |
| 8,682,299 B2 | 3/2014 | Jung et al. | |
| 2001/0051517 A1 | 12/2001 | Strietzel | |
| 2002/0010630 A1 | 1/2002 | Kitamura | |
| 2002/0072848 A1* | 6/2002 | Hamada et al. | 701/211 |
| 2002/0090934 A1 | 7/2002 | Mitchelmore | |
| 2002/0120589 A1* | 8/2002 | Aoki | 705/400 |
| 2002/0128907 A1 | 9/2002 | Sato et al. | |
| 2002/0165773 A1 | 11/2002 | Natsuno et al. | |
| 2002/0184097 A1* | 12/2002 | Hijiri et al. | 705/14 |
| 2003/0125958 A1 | 7/2003 | Alpdemir et al. | |
| 2003/0149938 A1* | 8/2003 | McElfresh et al. | 715/517 |
| 2004/0006478 A1 | 1/2004 | Alpdemir et al. | |
| 2004/0076279 A1 | 4/2004 | Taschereau | |
| 2004/0140989 A1* | 7/2004 | Papageorge | 345/700 |
| 2004/0224662 A1 | 11/2004 | O'Neil et al. | |
| 2005/0004840 A1* | 1/2005 | Wanninger | 705/14 |
| 2005/0005242 A1* | 1/2005 | Hoyle | 715/745 |
| 2005/0021744 A1 | 1/2005 | Haitsuka et al. | |
| 2005/0027594 A1* | 2/2005 | Yasnovsky et al. | 705/14 |
| 2005/0054381 A1 | 3/2005 | Lee et al. | |
| 2005/0160014 A1* | 7/2005 | Moss et al. | 705/26 |
| 2006/0004627 A1 | 1/2006 | Baluja | |
| 2014/0108150 A1 | 4/2014 | Roth | |

FOREIGN PATENT DOCUMENTS

| | | | | |
|---|---|---|---|---|
| EP | 1 143 679 A2 | | 10/2001 | H04L 29/06 |
| EP | 001143679 A2 * | | 10/2001 | |
| JP | 11-88521 A | | 3/1999 | |
| JP | 2000-228704 A | | 8/2000 | |
| JP | 2001-186575 | | 7/2001 | |
| JP | 2001-186575 A | | 7/2001 | |
| JP | 2001-357291 | | 12/2001 | |
| JP | 2001357291 A * | | 12/2001 | |
| JP | 2002-063479 | | 2/2002 | |
| JP | 2002-063479 A | | 2/2002 | |
| JP | 2002-092481 A | | 3/2002 | |
| JP | 2002-099837 A | | 4/2002 | |
| JP | 2002-304142 A | | 10/2002 | |
| JP | 2003-050767 | | 2/2003 | |
| JP | 2003-228675 A | | 8/2003 | |
| JP | 2004-286872 | | 10/2004 | |
| JP | 2004-286872 A | | 10/2004 | |
| JP | 2005-032272 A | | 2/2005 | |
| WO | WO 00/77978 | | 12/2000 | H04L 12/00 |
| WO | WO 01/91488 | | 11/2001 | H04Q 7/22 |
| WO | WO 02/31814 | | 4/2002 | G10L 15/26 |
| WO | 02/35377 A2 | | 5/2002 | |
| WO | WO 02/41169 | | 5/2002 | G06F 17/20 |
| WO | WO 2004/054217 | | 6/2004 | H04M 1/725 |
| WO | WO 2005/020094 | | 3/2005 | G06F 17/30 |

OTHER PUBLICATIONS

Hemphill et al., "Surfing the Web by Voice," *Proceedings ACM Multimedia*, 215-222 (Nov. 1995).

White, M., "Multimodal interaction and the mobile Web, Part 2: Simple searches with Find-It", (Feb. 6, 2005), http://www-128.ibm.com/developerworks/web/library/wi-mobweb2/> retrieved on Oct. 31, 2006.

*Nokia 616 Car Kit*, [online] [retrieved on Sep. 29, 2005]. Retrieved from the Internet <URL:http://europe.nokia.com/nokia/0,,65324,00.html>.

*Google Short Message Service (SMS)*, [online] [retrieved on Sep. 29, 2005]. Retrieved from the Internet <URL:http://www.google.com/sms/>.

International Search Report and Written Opinion PCT/US2006/030229 mailing date Feb. 23, 2007.

International Preliminary Report on Patentability and the Written Opinion of the International Searching Authority for International Application No. PCT/US2006/030229 issued on Feb. 20, 2008.

European Search Report for Application No. EP 10 19 2638 dated Feb. 21, 2011.

European Search Report for Application No. EP 10 19 2639 dated Feb. 17, 2011.

Office Action for Japanese Patent Application No. 2008-526969 mailed Jul. 14, 2011.

Office Action for Chinese Application No. 200680034011.5 mailed Feb. 11, 2011.

Office Action for Chinese Application No. 200680034011.5 mailed Mar. 5, 2012.

Office Action for European Application No. 06789284.4 mailed Nov. 26, 2008.

Office Action for European Application No. 06789284.4 mailed Feb. 24, 2011.

Notice of Allowance for European Application No. 06789284.4 mailed Dec. 18, 2012.

Office Action for European Application No. 10192638.4 mailed Nov. 14, 2012.

Office Action for European Application No. 10192639.2 mailed Nov. 14, 2012.

Office Action for Japanese Application No. 2008-526969 mailed Jun. 5, 2012.

Office Action for Japanese Application No. 2012-006296 mailed Apr. 12, 2013.

\* cited by examiner

METHOD OF COMPENSATING A PROVIDER FOR ADVERTISEMENTS DISPLAYED ON A MOBILE PHONE

FIELD OF THE INVENTION

The invention relates generally to the field of advertising and more specifically to the field of compensating the distributor of advertisements.

BACKGROUND OF THE INVENTION

Advertising is ubiquitous. As a result, advertisements lose their effectiveness as the potential purchaser is saturated with unwanted ads. Advertisers, to compensate for this decline in effectiveness, search for additional venues in to place advertisements. Such recently used new venues for advertisement placement include: preludes to movies in movie theaters, advertisements embedded in DVDs; and as pop-up ads on computers.

One area that is relatively untapped for advertisement placement is the display screen of mobile phones. Because there are billions of mobile phones in use in the world, each having a visual and audible display, mobile or cellular phones are a significant venue for providing such advertisements to a large audience. Because the screen in each of these cell phones is typically idle, and because a cell phone user must look at the screen each time he or she uses the phone, the cell phone display is a potentially the most valuable venue for placing an advertisement.

A problem with advertising is that it is not directed to the individual. Advertisers typically must perform surveys or look at product sales during an advertising campaign to determine how effective the advertising campaign is with respect to the target audience. Even using these metrics the advertiser typically pays the same for the distribution of a productive advertisement in a campaign as for a non-productive advertisement in a campaign.

What is needed is a method for linking the costs of placing the advertisement with the value of the advertisement. The present invention addresses this issue.

SUMMARY OF THE INVENTION

The invention relates to a method and apparatus for advertising on a mobile phone. In one embodiment the method includes the steps of downloading an advertisement to the mobile phone using an advertisement server; selecting the downloaded advertisement on the mobile phone by a user of the mobile phone; providing, by a server, additional information in response to the user selection; and tracking the selection and additional information by the server. In another embodiment the step of providing additional information includes the step of connecting the mobile phone to a second server in response to the user selection. In yet another embodiment the method further includes the step of providing incentives to the user for permitting an advertisement to be downloaded to the mobile phone. In still yet another embodiment the incentive is a reduction in mobile phone fees.

In another embodiment the step of selecting is performed by voice recognition. In yet another embodiment the voice recognition is performed using imbedded tags in said advertisement. In still yet another embodiment the method also includes providing compensation to the mobile phone service provider by an advertiser. In another embodiment the compensation provided is in response to the display screen of said advertisement. In yet another embodiment the method further includes the step of exchanging information between said server and said mobile phone. In still yet another embodiment the information includes the capabilities of the mobile phone. In another embodiment the step of providing additional information includes the step of using space reserved, in the user interface of the mobile phone, for advertisements.

In another aspect the invention relates to a system for displaying advertisements on a mobile phone. In one embodiment the system includes a server; and a mobile phone in communication with said server. In one embodiment mobile phone includes a user interface and a user input device. The server downloads an advertisement to the mobile phone for display by the user interface. In one embodiment the server tracks advertising usage by the user in response to the advertisement being downloaded.

In another embodiment the system further includes a communication connection to a second server in response to the downloaded advertisement. In yet another embodiment the system includes a billing system providing compensation to the user for allowing the advertisement to be downloaded to the mobile phone. In one embodiment the user input device includes a voice recognition system. In another embodiment the system further includes a compensation system in communication with the server to provide compensation to a mobile phone service provider by an advertiser in response to the advertisement being downloaded. In yet another embodiment the user interface includes a screen space reserved for advertising.

Yet another aspect of the invention is a system for advertising on a mobile phone. In one embodiment the system includes means for downloading an advertisement to the mobile phone of a user; means for allowing a user to select the advertisement being downloaded; means for providing additional information to the user in response to the selection by the user; and means for tracking advertisement selection. In one embodiment the system further includes means for connecting to a second server in response to said selected advertisement. In another embodiment the system includes means for providing incentives to a user for allowing an advertisement to be downloaded. In yet another embodiment the means for allowing a user to select includes means for voice recognition.

In one embodiment the system further includes providing means for providing compensation to a mobile cell phone service provider in response to a user selecting an advertisement. In another embodiment the system further includes means for exchanging information prior to downloading the advertisement to the mobile phone. In another embodiment the invention relates to a method for advertising on a mobile phone by reserving space at a location on a mobile phone display for the purpose of displaying advertisements, downloading, to the reserved space on the mobile phone, an advertisement from an advertiser using an advertisement server, and billing the advertiser in response to the location of the reserved space.

DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION OF THE PREFERRED EMBODIMENT

Figure 1:
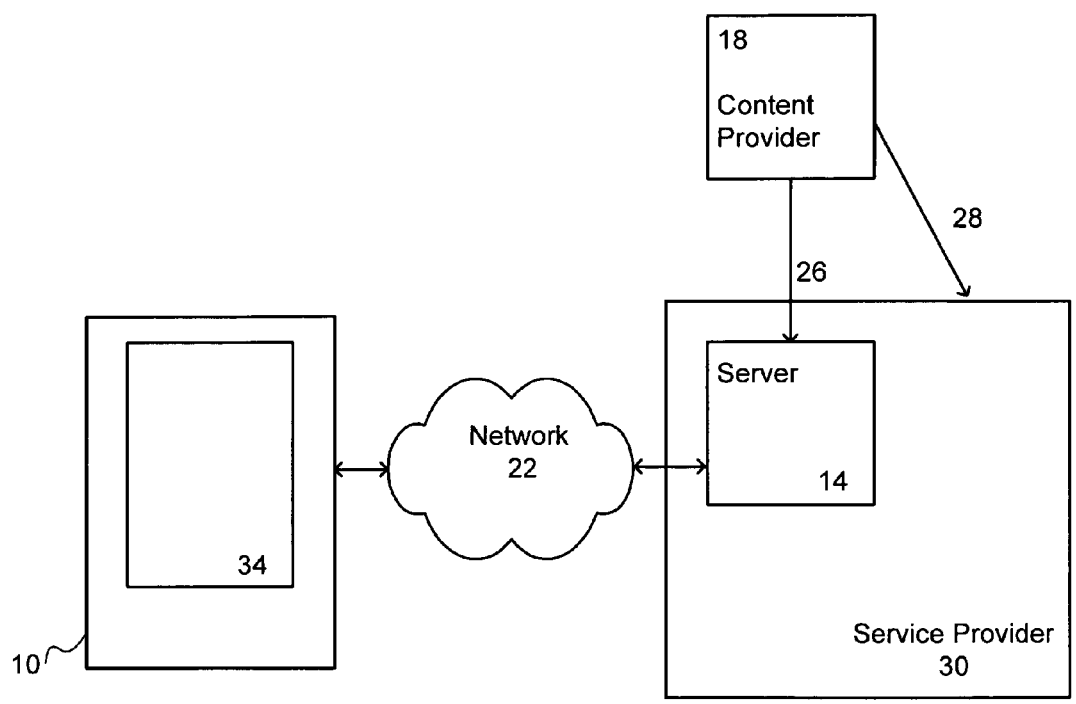
FIG. 1 is a block diagram of an embodiment of the system of the invention.

Referring to FIG. 1, and in brief overview, an embodiment of a system constructed in accordance with the invention includes a mobile communication device such as a cell phone 10, an advertisement server 14; an advertisement provider 18 and a network 22. The cell phone 10 is configured to receive advertisements from an advertisement server 14. The advertisement server 14 typically is part of the network of a mobile communications device provider 30. The advertisements 26 are provided to the advertisement server 14 by an advertiser content provider 18 who remunerates 28 the mobile communications device provider 30 according predetermined criteria based on the display of the advertisement on the screen 34 of the mobile communications device 10.

Software built into the cell phone is capable of rendering graphics of the advertisement which are downloaded to the display. Further, the user can select the advertisement in order to obtain further information about the product.

Figure 2:
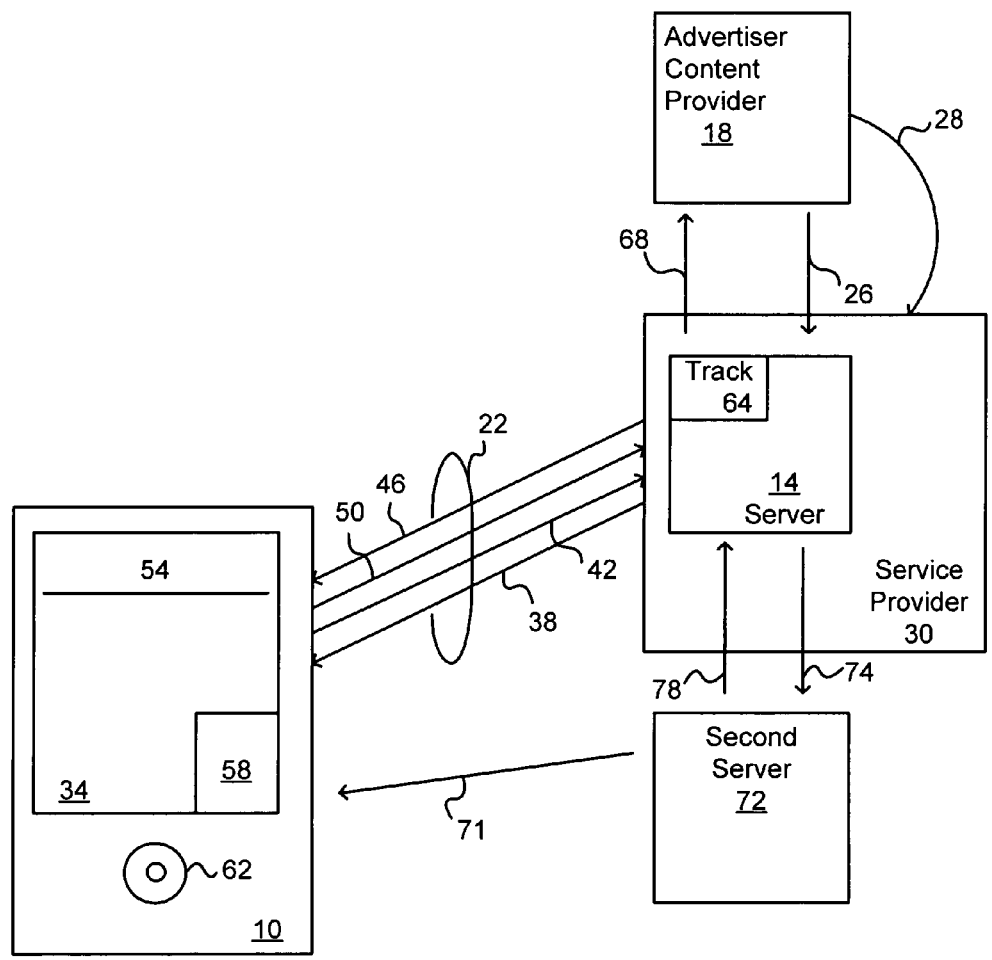
FIG. 2 is a more detailed diagram of the embodiment of the invention in FIG. 1.

In more detail and referring to FIG. 2, a mobile communications device such as a cell phone 10 is configured to receive advertisements from a server 14 typically provided by a mobile communications device service provider 30. In one embodiment the user of the mobile communications device 10 is given an incentive to permit advertisements to be downloaded from the server 14 to the mobile communications device 10. These incentives may range from coupons or credits that are redeemable by the user for the merchandize advertised to a decrease in the monthly cost of the mobile communications service to the user. These incentives may be provided by the mobile communications service provider 30 or the advertiser content provider 18 directly.

Initially the server 14 interrogates 38 the mobile communications device 10 to determine its display capabilities. The mobile communications device 10 responds with information 42 indicating its display parameters such as screen size. At this point the server 14 downloads the advertisement 46 in a form suitable for display on screen 34. The user then responds to the advertisement by transmitting a request 50 for additional screens of information (generally 46), if the user so desires.

In one embodiment the location of the advertisement 46 in the display screen 34 determines the charge to the advertiser 18. For example a banner location 54 may be selected to have a higher value than a corner location 58. This is similar to the mechanism by which merchandise producers pay merchants various amounts according to the location of the producer's product on shelf space in the store. Products placed on shelves at eye level result in higher payments to the merchants than do products placed on lower or higher shelves. These reserved locations 54, 58 on the screen 34 provide one criteria for paying the service provider 30 for the download of advertisements to the mobile communications device 10.

A second criterion for providing payment to the service provider 30 is provided by the interest the user has in the advertisement. That is, if the user receives an advertisement in which he or she is interest, the user can use the input device or keypad 62 of the mobile communication device 10 to send a request 50 to the server 14 for additional screens of information. In one embodiment, a screen tracking module 64 keeps track of how many screens the user requests and sends a notification to the advertiser content provider 18. This notification acts as an invoice indicating which advertisements were viewed by the user and the cost to the advertiser 18 for each of the downloaded advertisement screens.

In another embodiment, a second server 72 is utilized when the user sends a request 50 for additional information in response to the advertisement. In one such embodiment the server 14 passes off control 74 of the down load of information 76 directly to the secondary server 72. In another embodiment the secondary server 72 passes the requested advertising information 78 to the server 14 which then downloads the information 46 to the mobile communication device 10. In some embodiments the second server belongs to the manufacturer of the product or service advertised or belongs to the advertiser content provider 18.

Figure 3:
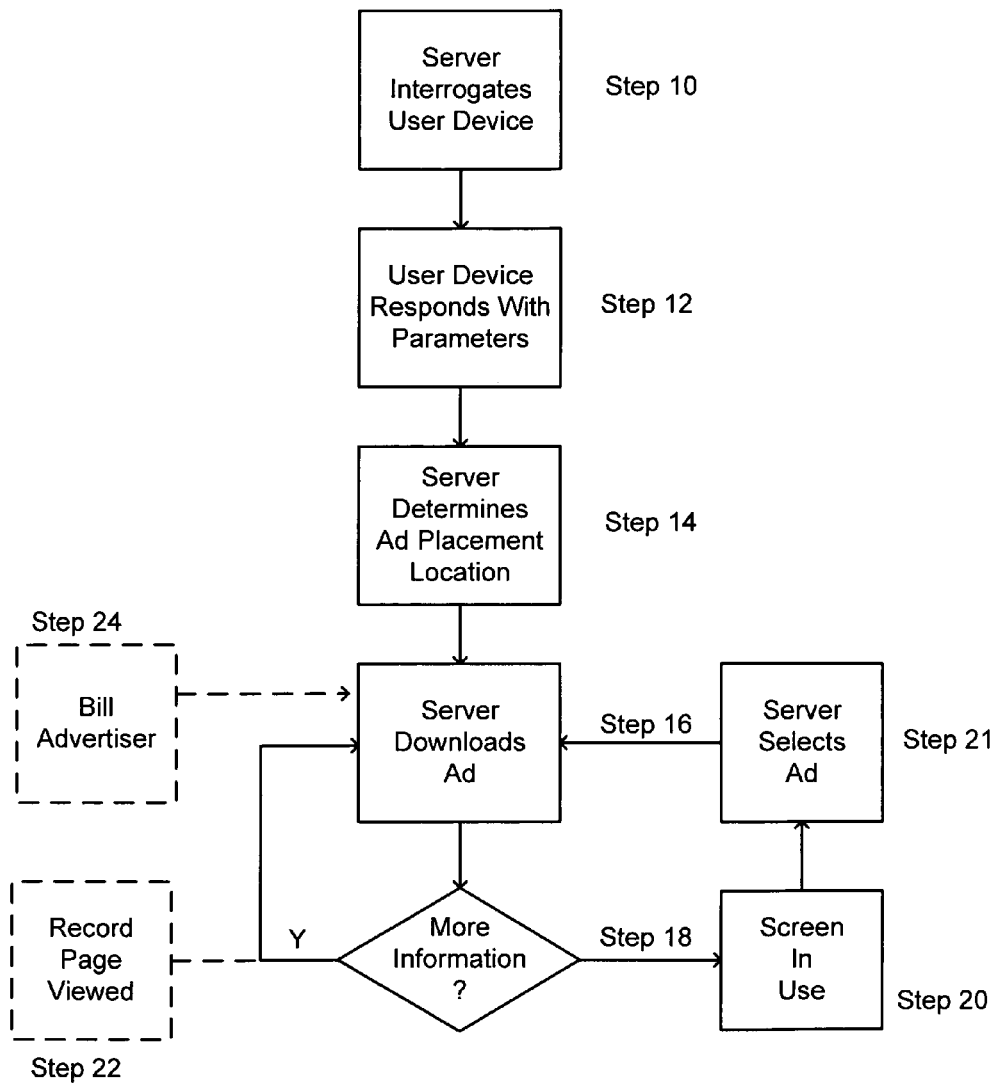
FIG. 3 is a flow diagram utilized by the embodiments of the invention shown in FIGS. 1 and 2.

Referring also to FIG. 3, the operation of an embodiment of the invention is shown. Initially the server interrogates (Step 10) the mobile communications device to determine its display capabilities. The mobile communications device responds (Step 12) with information indicating its display parameters such as screen size. The server then determines (Step 14) in which location on the screen is the advertisement is to be placed, based upon the contact between the advertiser and the mobile phone service provider. At this point the server downloads (Step 16) the advertisement in a form suitable for display on screen. The user then responds (Step 18) to the advertisement by transmitting a request for additional screens of information, if the user so desires. If the user does not desire additional information, the screen is either then taken out of idle mode for use by the user (Step 20) or another ad is displayed (Step 21) if the user does not use the screen in a predetermined amount of time.

Optionally, the server maintains (Step 22) a list of the pages requested by the user. The advertiser is then billed (Step 24) by the service provider according to how many requests for additional information is made by the user or how many links into the web pages are traversed by the user. Alternatively, the cost to the advertiser for display of the web page in one embodiment varies according to the web page. A "deep" web page with specific information is costs the advertiser more than a high level general web page. The assumption here is that a user that wants more information is interested in the product and hence is more valuable to the advertiser. Thus for example, if a user traversed three links to get to the web page of interest, the advertiser could in one embodiment be billed for three links or the "deep" (i.e. 3 link) web page could be billed to the advertiser at a higher rate than the top level web page.

The foregoing description has been limited to a few specific embodiments of the invention. It will be apparent, however, that variations and modifications can be made to the invention, with the attainment of some or all of the advantages of the invention. It is therefore the intent of the inventor to be limited only by the scope of the appended claims.

What is claimed is:

1. A method comprising acts of:
   a) reserving space at a fixed location on a mobile phone display for the purpose of displaying advertisements, the fixed location associated with a cost for advertising that depends, at least in part, on the location;
   b) providing an advertisement of an advertiser to be displayed on the reserved space on the mobile phone display; and
   c) billing the advertiser an amount for the display of the advertisement, the amount being determined based, at least in part, on the cost associated with the fixed location of the reserved space on the mobile phone display, wherein the act of billing the advertiser an amount determined based, at least in part, on the fixed location of the reserved space on the mobile phone display comprises billing an amount that is higher when the fixed location is a banner location than when the fixed location is a corner location.

2. The method of claim 1, wherein the method is performed by a mobile cell phone service provider.

3. The method of claim 1, further comprising an act of causing the advertisement to be displayed on the mobile phone display.

4. The method of claim 1, further comprising an act of displaying the advertisement on the mobile phone display.

5. The method of claim 1, wherein the act of reserving space at a fixed location on the mobile phone display comprises reserving at least two distinct spaces at two distinct fixed locations for the purpose of displaying advertisements.

6. A method comprising acts of:
reserving a fixed location on a display of a mobile cell phone for an advertisement to be displayed, the fixed location associated with a cost for advertising that depends, at least in part, on the fixed location;
delivering at least one advertisement to the mobile cell phone by a mobile cell phone service provider for display at the fixed location; and
receiving payment at the mobile cell phone service provider for the display of the at least one advertisement, an amount of the payment being determined based, at least in part, on the cost associated with the fixed location on the display of the mobile cell phone where the at least one advertisement is displayed,
wherein the act of receiving payment in an amount determined based, at least in part, on the fixed location of the reserved space on the mobile phone display comprises receiving an amount that is higher when the fixed location is a banner location than when the fixed location is a corner location.

7. The method of claim 6, further comprising an act of causing the at least one advertisement to be displayed on the display of the mobile cell phone.

8. The method of claim 6, further comprising an act of displaying the advertisement on the display of the mobile cell phone.

9. The method of claim 6, wherein the act of reserving the fixed location on the mobile phone display comprises reserving at least two distinct fixed locations for the purpose of displaying advertisements.

10. A method comprising acts of:
delivering at least one advertisement of an advertiser to a mobile cell phone for display at a fixed location on a display of the mobile cell phone, the location associated with a cost for advertising that depends, at least in part, on the fixed location; and
determining an amount of a charge to the advertiser for display of the at least one advertisement based, at least in part, on the cost associated with the fixed location on the display of the mobile cell phone,
wherein the act of determining an amount of the charge based, at least in part, on the fixed location on the display comprises charging an amount that is higher when the fixed location is a banner location than when the fixed location is a corner location.

11. The method of claim 10, wherein the method is performed by a mobile cell phone service provider that provides cell phone service to the mobile cell phone.

12. The method of claim 10, further comprising an act of causing the advertisement to be displayed on the display of the mobile cell phone.

13. The method of claim 10, further comprising an act of displaying the advertisement on the display of the mobile cell phone.

14. The method of claim 10, further comprising an act of billing the advertiser the charge.

15. The method of claim 10, further comprising an act of receiving payment from the advertiser for the charge.

16. The method of claim 10, wherein the act of delivering at least one advertisement of an advertiser to a mobile cell phone for display at the fixed location on a display of the mobile cell phone comprises delivering at least one advertisement of an advertiser to a mobile cell phone for display at the fixed location that is reserved on the display for the display of one or more advertisements.

17. The method of claim 16, wherein the act of delivering at least one advertisement of an advertiser to a mobile cell phone for display the fixed location that is reserved on the display for the display of one or more advertisements comprises delivering at least two advertisements for display at at least two distinct fixed locations on the display reserved for the display of one or more advertisements.

18. A system comprising:
a mobile communications service provider that provides mobile phone services to a plurality of mobile phones, the mobile communications service provider comprising at least one server that:
delivers at least one advertisement of an advertiser to at least one of the plurality of mobile phones for display at a fixed location reserved on a display of the at least one of the plurality of mobile phones, the fixed location associated with a cost for advertising that depends, at least in part, on the fixed location; and
determines an amount of a charge to the advertiser for display of the at least one advertisement based, at least in part, on the cost associated with the fixed location on the display of the at least one of the plurality of mobile phones,
wherein the at least one server determines an amount of the charge that is higher when the fixed location is a banner location than when the fixed location is a corner location.

19. The system of claim 18, wherein the at least one server causes the advertisement to be displayed on the display of the at least one of the plurality of mobile phones.

20. The system of claim 18, wherein the at least one server bills the advertiser the charge.

21. The method of claim 18, wherein the at least one server delivers the at least one advertisement to the mobile phone for display at the fixed location that is reserved on the display for the display of one or more advertisements.

22. The method of claim 18, wherein the at least one server delivers at least two advertisements for display at at least two fixed distinct locations on the display reserved for the display of one or more advertisements.

* * * * *